Oct. 23, 1928.
E. J. PALMER
1,688,877
VALVE FOR FLUSH TANKS
Filed Nov. 29, 1926
Fig. 1.
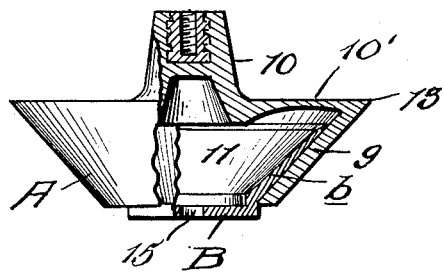
Fig. 3.
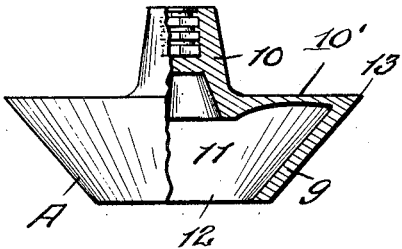
Fig. 2.
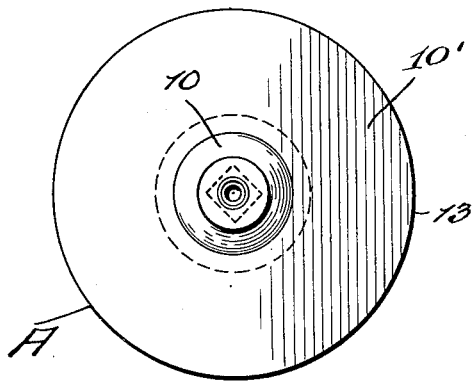
Fig. 4.
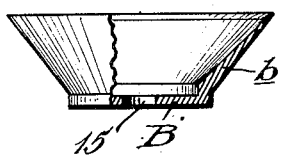
Fig. 5.
Fig. 6.
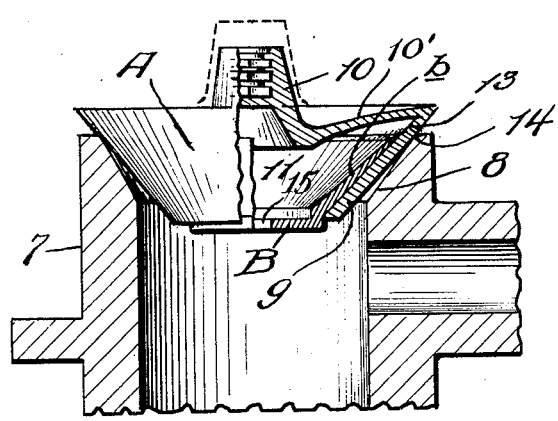
Inventor
Eli J. Palmer
By R. S. Berry
Attorney.

Patented Oct. 23, 1928.

1,688,877

UNITED STATES PATENT OFFICE.

ELI J. PALMER, OF LOS ANGELES, CALIFORNIA, ASSIGNOR TO CALIFORNIA PRODUCTION COMPANY, OF LAS VEGAS, NEVADA, A CORPORATION OF NEVADA.

VALVE FOR FLUSH TANKS.

Application filed November 29, 1926. Serial No. 151,315.

This invention relates to improvements in valves for flush tanks, and more particularly to such valves as are formed of rubber and by molding. The valves of the art comprise surrounding walls having external surfaces shaped to form face contacts with valve seat faces; cavities at their tops whereby water pressure will firmly seat them relative to the valve seats, and, relatively wide mouth, open bottomed, cavities for flotation, and are not efficient because of the required full face seating upon the valve seat; because water is carried at their tops which imposes a load, resisting flotation, by the cavity, and, because the wide open mouth, primarily designed to afford constant drain of the cavity, offers resistance at times to flotation.

Among the objects of my invention is to construct such a valve or rubber having the wide open mouth cavity whereby it may be readily formed as by molding; whose external surface is substantially cone-shape and bearing an angle differing from the angle of the face of the valve seat, whereby water sealing is effected by only a line engagement and whose wide open mouth is partially closed by a separate element which provides drainage for the cavity and overcomes the resistance to flotation offered by the wide open mouth.

My improvements consist in the novel construction, arrangement and combination of parts as hereinafter fully, clearly and concisely described, definitely pointed out in my claims and illustrated by the accompanying drawing (1 sheet) in which—

Fig. 1, is an elevation, partly in section, of a valve embodying my improvements.

Fig. 2, is a plan view of the valve.

Fig. 3, is a view similar to Fig. 1 illustrating the principal valve elements.

Fig. 4, is an elevation, partly in section, of the cavity closure.

Fig. 5, is a plan view of cavity closure.

Fig. 6, is a view of the valve as related to a valve seat in sealing position, and shows by dotted lines the normal, non-distorted shape of the valve.

Referring more specifically to the drawing 7 designates the drain-pipe valve casing having the valve face 8, which is of common construction.

A designates the principal valve element, whose body is of substantially frusto-conical shape and whose surrounding wall 9 is thin and flexible and is of such angle as to present only a line contact with the valve seat, when it first engages the latter.

Surmounting the body is a boss 10 carrying a metallic seat for an actuating rod (not shown) and extending from the boss to the surrounding wall of the body is a web 10', or diaphragm, encircling the boss 10 which is relatively thin and highly flexible; the web by thus having a wall thickness less than that of the valve side wall will form the valve with a top wall having greater flexibility than said side wall.

Such body, as formed by the boss, web and surrounding wall, is formed hollow whereby a floatation cavity 11 is formed, and such body is formed of water resisting material, such as rubber, and by molding, and for which reason the open mouth 12 of the cavity is of such size as to provide ready removal of the forming core from the molded article.

The upper surface of the web is substantially flat to the end that is will not retain a volume of water thereover; will afford ample pressure area for the proper sealing of the wall 9 and projecting thin flexible lip 13, at the extremities of the web and wall in and over the crown or inner margin 14 of the valve seat, and said web is highly flexible whereby there may be flexure between the boss and surrounding wall to permit the surrounding wall to be moved as required for its proper sealing position relative to a disaligned, or out of true position of the boss as affected by water action, or a defectively guided pull-rod.

The recited resistance to flotation which is offered by the wide mouth of the cavity I overcome by providing a separate septum B which is provided with a relatively small drain opening 15 and which is retained by an upstanding flexible wall b which fits within the cavity and bears against the inner face of the surrounding wall of the valve proper. On account of the flexible wall B being separate from the wall of the valve proper, it does not interfere with the latter being laterally expanded to produce a more perfect fit over the top of the valve seat under water pressures, as illustrated in Fig. 6.

The web b is tapered to a thin edge so as to render it highly flexible to permit the wall

*b* being readily contracted for insertion into the mouth 12 of the valve body and when positioned in the valve body offering no appreciable resistance to flexing of the wall 9 thereof.

I claim:

1. As a new article of manufacture a partial closure element, for open mouthed hollow float valves, having a drain hole and an extension serving as a retainer for the closure element, said extension being sufficiently flexible to permit insertion of said element through the mouth of the valve, said extension overlying and reinforcing the greater portion of the lateral wall of the inside portion of the valve.

2. A valve of the class described comprising a substantially flat web of sufficient flexibility to permit a substantial universal movement of the pull rod relatively to the web, a boss for connection with a pull rod formed centrally of said web, and a frusto conical wall extending downwardly from the margin of said web.

3. A valve of the class described comprising a substantially flat flexible web, a boss for connection with a pull rod formed centrally of said web, a frusto conical wall extending downwardly from the margin of said web; said web being provided with a relatively thin and highly flexible annular wall portion extending between said boss and said frusto conical wall.

4. A tank valve of the class described, having a frusto-conical body of soft flexible material and a substantially horizontal top containing a diaphragm wall of substantially thinner material than the adjacent portions of the valve to provide a universal movement between the valve and stem, and a stem formed integral with said diaphragm wall.

In testimony whereof, I have affixed my signature.

ELI J. PALMER.